United States Patent
Moon (10) Patent No.: US 8,379,073 B2
(45) Date of Patent: Feb. 19, 2013

(54) METHOD FOR STORING DATA OF VIDEO TELEPHONY CALL IN MOBILE TERMINAL AND SYSTEM THEREOF

(75) Inventor: Yun Joo Moon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 574 days.

(21) Appl. No.: 12/642,975

(22) Filed: Dec. 21, 2009

(65) Prior Publication Data

US 2010/0157014 A1    Jun. 24, 2010

(30) Foreign Application Priority Data

Dec. 19, 2008 (KR) .................. 10-2008-0129763

(51) Int. Cl.
*H04N 7/14* (2006.01)
*H04M 3/00* (2006.01)
*G06F 15/16* (2006.01)

(52) U.S. Cl. ............. 348/14.02; 348/14.01; 348/14.06; 348/14.08; 370/270; 370/503; 379/265.01; 382/209; 386/328; 396/51; 455/3.06; 455/414.1; 455/445; 455/465; 705/500; 709/228; 725/106

(58) Field of Classification Search ............... 348/14.01, 348/14.02, 14.06, 14.08; 370/270, 503; 382/209; 386/328; 396/51; 455/3.06, 414.1, 445, 455/465; 725/106; 379/265.01; 705/500; 709/228
See application file for complete search history.

(56) References Cited

U.S. PATENT DOCUMENTS

| | | | | |
|---|---|---|---|---|
| 6,677,976 | B2* | 1/2004 | Parker et al. | 348/14.08 |
| 7,532,231 | B2* | 5/2009 | Pepperell et al. | 348/14.08 |
| 7,551,782 | B2* | 6/2009 | Haim Lev | 382/209 |
| 7,860,382 | B2* | 12/2010 | Grip | 396/51 |
| 7,929,465 | B2* | 4/2011 | Parker et al. | 370/270 |
| 8,125,507 | B2* | 2/2012 | Ryu et al. | 348/14.02 |
| 8,169,462 | B2* | 5/2012 | Ryu | 348/14.02 |
| 2004/0248594 | A1* | 12/2004 | Wren, III | 455/465 |
| 2005/0095981 | A1* | 5/2005 | Benco | 455/3.06 |
| 2005/0277421 | A1* | 12/2005 | Ng | 455/445 |
| 2006/0244814 | A1* | 11/2006 | Jung | 348/14.01 |
| 2007/0036330 | A1* | 2/2007 | Wagner et al. | 379/265.01 |
| 2007/0064743 | A1* | 3/2007 | Bettis et al. | 370/503 |
| 2007/0139514 | A1* | 6/2007 | Marley | 348/14.01 |
| 2008/0002020 | A1* | 1/2008 | Choi et al. | 348/14.02 |
| 2008/0016012 | A1* | 1/2008 | Stancombe et al. | 705/500 |
| 2009/0124238 | A1* | 5/2009 | Wilson | 455/414.1 |
| 2009/0240818 | A1* | 9/2009 | Hyndman et al. | 709/228 |
| 2009/0290855 | A1* | 11/2009 | Kowalski et al. | 386/109 |
| 2010/0058409 | A1* | 3/2010 | Chapman et al. | 725/106 |
| 2010/0157014 | A1* | 6/2010 | Moon | 348/14.02 |

* cited by examiner

*Primary Examiner* — Gerald Gauthier (74) *Attorney, Agent, or Firm* — Cha & Reiter, LLC (57) ABSTRACT

A system for storing data during a video telephony call includes a portable terminal which requests data storing; a base station connected to the portable terminal and requests storing of the data to a recording server; a recording server which requests a user registration and data storing to a data management server, and transmits a message indicative of the start of the data storing to the base station; and a data management server which provides the storage of the recorded data.

20 Claims, 6 Drawing Sheets

METHOD FOR STORING DATA OF VIDEO TELEPHONY CALL IN MOBILE TERMINAL AND SYSTEM THEREOF

CLAIM OF PRIORITY

This application claims a priority under 35 USC §119 to an earlier filed Korean patent application filed in the Korean Intellectual Property Office on Dec. 19, 2008 and assigned Serial No. 10-2008-0129763.

BACKGROUND OF THE INVENTION

1. Field of the Invention

The present invention relates to a method and system for storing data during a video telephony call, and more particularly, to a method and system for storing data in a mobile communication server during a video telephony call by a portable terminal having a video telephony call function.

2. Description of the Related Art

A portable terminal is equipped with a function of rapidly transmitting data as well as a voice call function. As high-speed data transmission is becoming popular, a portable terminal having a video telephony call function is an area of great interests. The current wireless data communication network has not sufficiently considered functions related with video telephony call due to data transmission speed and the compatibility issues. However, as data transmission technology is enhanced by WCDMA (Wideband Code Division Multiple Access), HSDPA (High-Speed Downlink Packet Access) or the like, portable terminals with a video telephony call function have become commercialized. Moreover, the availability of wider screens enabled the resolution of the portable terminals to becomes higher, so it is possible to clearly show user and its surroundings during a video telephony call.

During a video telephony call, it is possible to have a conversation while looking at a receiving party, thus a user may desire to preserve video and audio data generated during the video telephony call. Some portable terminals can record video and audio data of the receiving party during a video telephony call.

In order for a user to store data during a video telephony call in a portable terminal, an ample memory space is required which prevents the user to use such a feature freely.

Also, since the size of the recorded data is large, it is difficult to transmit to a web server or to another user.

Further, a portable terminal equipped for a video telephony call drastically reduces the battery life if the recording feature is on during a video telephony call which causes the video telephony call to be dropped or communication with the base station to be disconnected.

SUMMARY OF THE INVENTION

The present invention has been made in view of the above problems and provides additional advantages, by providing a method and system for storing data recorded during a video telephony call in a mobile communication server regardless of the size of internal memory of a portable terminal.

The present invention further provides a method and apparatus of downloading large data stored in a mobile communication server to a portable terminal or transmitting the data to a web server.

The present invention further provides a method and apparatus of reducing battery consumption during a recording mode by storing data in a mobile communication server.

In accordance with an aspect of the present invention, a system for storing data during a video telephony (VT) call includes: a portable terminal which requests data storing if a recording request signal is sensed during a video telephony call; a base station which is connected to the portable terminal and requests storing of the data to a recording server; a recording server which requests user registration and data storing to a data management server when storing of the data is requested, and transmits a message that informs of the start of the data storing to the base station; and a data management server which generates the data as recording data and stores the generated recording data.

In accordance with another aspect of the present invention, a method of storing data during a video telephony call includes: performing a video telephony call between portable terminals; requesting storing of data during the video telephony call; generating the data as recording data and storing the generated recording data; requesting a termination of data storing if the video telephony call is terminated; and transmitting the recording data.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In an exemplary embodiment of the present invention, storing data obtained during a video telephony call in a mobile communication server is explained as an illustrative example, but the teachings of the present invention can be applied to data that can be stored in a mobile communication terminal during a voice call as well as during a video telephony call.

In the present invention, "recording data" includes video data and/or audio data transmitted between portable terminals during a video telephony call. In the specification, the recording data is generated and stored in a mobile communication server upon approval from a participant during a video telephony call. The recording data can be downloaded to a portable terminal or can be transmitted to a web server in response to a user's request. Also, the recording data may include information corresponding to the type of a call, recording data size, receiver's information, date of recording, transmission of recording data, and a server to which data is transmitted.

Figure 1:
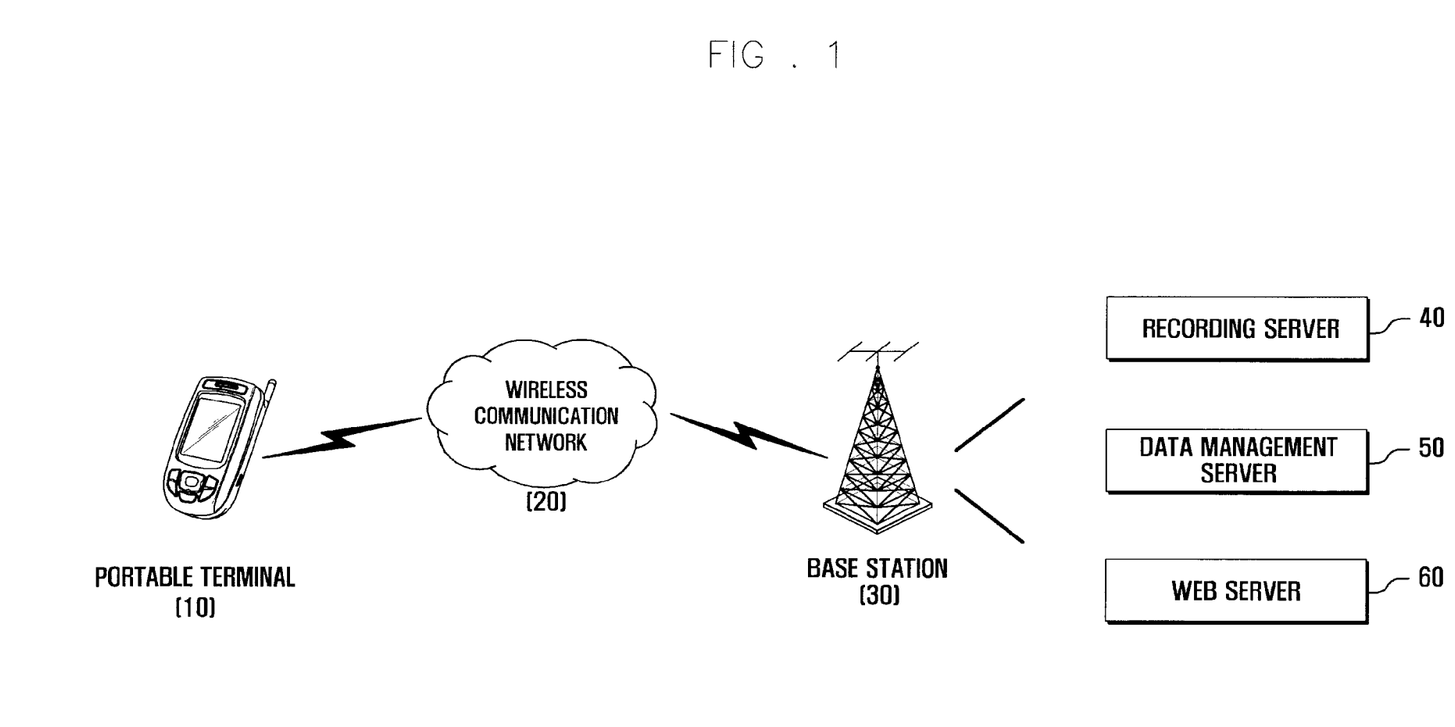
FIG. 1 illustrates a configuration of a system according to an exemplary embodiment of the present invention.

FIG. 1 illustrates a configuration of a system according to an exemplary embodiment of the present invention.

Referring to FIG. 1, a system for storing data during a video telephony call according to the present invention includes a portable terminal 10, a wireless communication network 20, a base station 30, a recording server 40, a data management server 50, and a web server 60.

In the embodiments of the present invention, a mobile communication server is classified into a recording server 40 and a data management server 50, but the mobile communication server may include various types of servers with data storing features.

A portable terminal 10 is connected to a base station 30 through a wireless communication network 20, and receives various communication services provided from the base station 30. Particularly, a portable terminal 10 according to the present invention requests a base station to store data to a data management server 50 during a video telephony call.

A portable terminal 10 in communication with a base station 30 can receive a video telephony call, voice calls and data communication services. Also, if a recording request signal is inputted by a user of a portable terminal 10, the portable terminal 10 can generate a recording approval message and transmit the message to another portable terminal through the base station 30.

When a message that approves the recording is received from the other portable terminal, the portable terminal 10 can transmit a signal that requests the recording to the base station 30. Thereafter, the portable terminal 10 can receive a recording start signal, and thereafter if user senses a video telephony call termination signal, the portable terminal 10 can request a termination of recording to the base station 30. Here, data can be stored in the data management server 50 among mobile communication servers.

If a video telephony call termination signal is received from a user, the portable terminal 10 requests a termination of the video telephony call to the base station 30. If the video telephony call is terminated, the portable terminal 10 can receive a recording data list transmitted from the base station 30. Here, a plurality of recording data stored in the data management server 50 is classified in stored date units and sequentially listed in the recording data list. Here, the recording data may include information corresponding to the call type, recording data size, receiver's information, date of recording, transmission of recording data, and a server to which data is transmitted. The recording data included in the recording data list in the embodiments of the present invention will be explained later in detail.

The portable terminal 10 can download the recorded data or can request the base station 30 to transmit the recorded data to the web server 60 in response to a user's input. The web server 60 may include an e-mail server, a blog server, and other various application servers.

The wireless communication network 20 provides a communication with the base station 30 so that the portable terminal 10 can wirelessly execute various services such as a voice call, a video telephony call, and data communication.

The base station 30 can be connected with the portable terminal 10 through the wireless communication network 20 for establishing a communication, such as a video telephony call, a voice call and data communication. At this time, the base station 30 can transmit a recording approval message requested from the portable terminal 10 during a video telephony call to another portable terminal. Thereafter, the base station 30 can transmit a response message of approval or disapproval transmitted from the other portable terminal participant, and can request the recording server 40 to register the user information and store data according to the data storage request by the portable terminal 10.

The base station 30 can receive a data storing start message transmitted from the recording server 40, and can transmit a subsequent message to the portable terminal 10. Thereafter, if a video telephony call termination request signal of the portable terminal 10 is received, the base station 30 terminates the video telephony call connection, and transmits a data storing termination signal to the recording server 40. Also, even when the video telephony call is not yet terminated, the base station 30 can receive a data storing termination signal transmitted from the portable terminal 10 and can transmit the received data storing termination signal to the recording server 40. Further, the base station 30 can transmit a data storing termination request signal to the recording server 40 according to a video telephony call termination request signal received from the other portable terminal. The base station 30 can transmit a message about the video telephony call termination request of the other portable terminal and a message according to data storing termination to the portable terminal 10.

The base station 30 can receive a recording data list transmitted from the data management server 50 and can transmit the recording data list to the portable terminal 10. Thereafter, the base station 30 receives a message that requests recording data transmission from the portable terminal 10 and transmits a message corresponding to the data management server 50.

The recording server 40 receives a signal related with data storage requested during a video telephony call transmitted from the base station 30, and transmits the signal to the data management server 50. Also, the recording server 40 can transmit a signal indicative of data stored therein from the data management server 50 to the base station 30.

The data management server 50 registers user information related to portable terminals in response to a data storing signal requested during a video telephony call, then stores the recorded data. The data management server 50 can store data in packet unit. Also, if a data storing termination signal is received, the data management server 50 transmits the stored recording data list to the base station 30. Thereafter, the data management server 50 can transmit the recorded data in response to a user's request to the portable terminal 10 or the web server 60.

The web server 60 can receive recorded data transmitted from the data management server 50 according to a user's request. Here, the web server 60 may include an e-mail server, a blog server and other various application servers.

Figure 2:
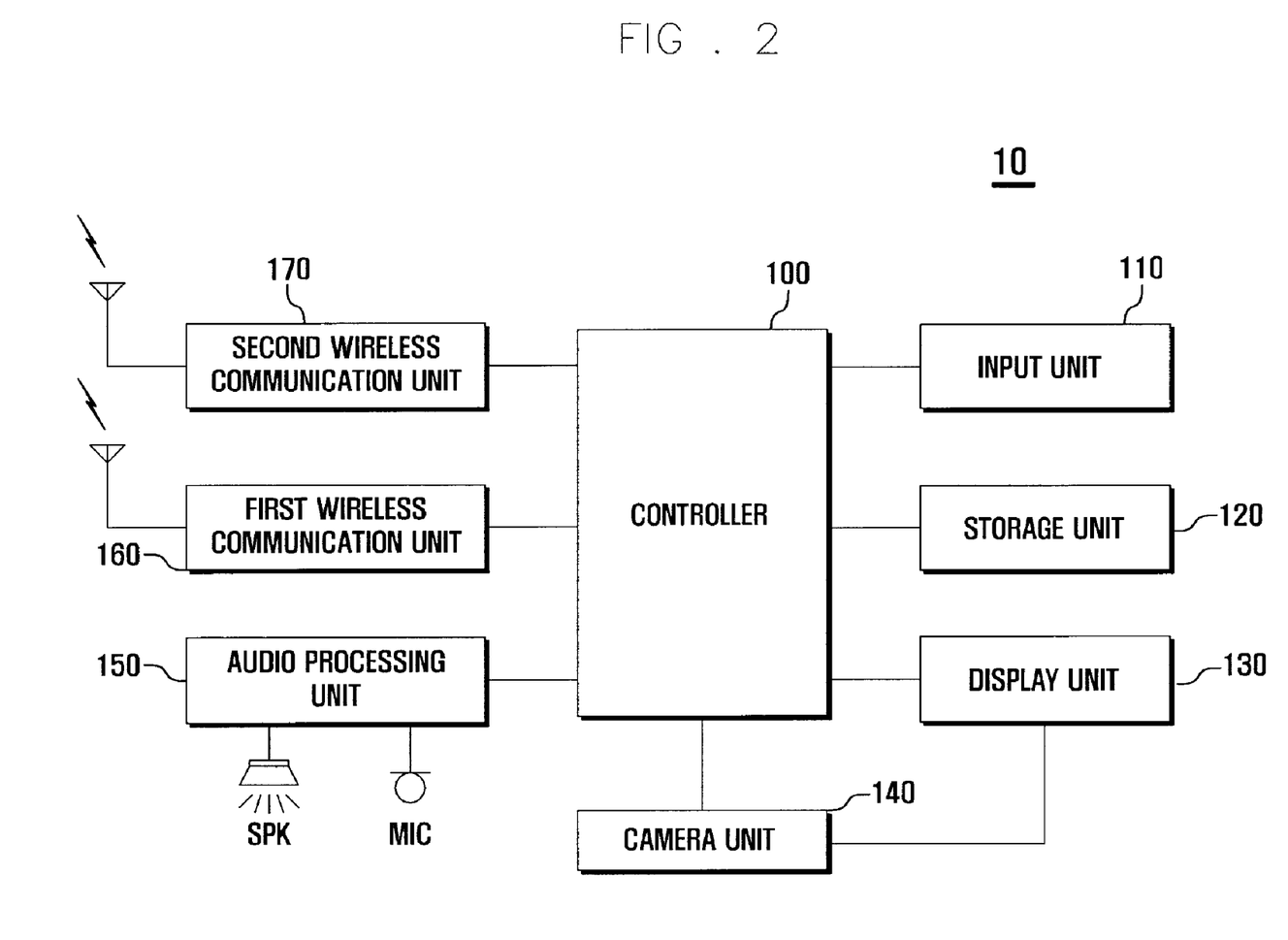
FIG. 2 illustrates a schematic configuration of a portable terminal according to an exemplary embodiment of the present invention.

FIG. 2 illustrates a schematic configuration of a portable terminal according to an exemplary embodiment of the present invention.

Referring to FIG. 2, a portable terminal includes a controller 100, an input unit 110, a storage unit 120, a display unit 130, a camera unit 140, an audio processing unit 150, a first wireless communication unit 160, and a second wireless communication unit 170.

The input unit 110 receives the input of various information such as number and character information and transmits a signal inputted in connection with the setting of various functions and function control of the portable terminal 10 to the controller 100. Also, the input unit 110 generates input signals, and includes at least one of a keypad and a touch pad. The input unit 110 and the display unit 130 can be formed as one touch pad (or one touch screen), and can perform input and display functions at the same time. Particularly, the input unit 110 can transmit a recording execution signal inputted from a user during a video telephony call to the controller 100. Also, the input unit 110 can transmit a signal that requests data storing during a video telephony call to the controller 100. Thereafter, the input unit 110 can transmit the recorded data to the web server 60 or can transmit a signal for downloading the recorded data to the controller 100.

The storage unit 120 stores an application program which is necessary for operating functions according to an exemplary embodiment of the present invention. Such a storage unit 120 includes a program area and a data area.

The program area may include an operating system which boots a portable terminal, a program which generates and transmits a recording approval message according to a user's request of a first portable terminal, a program which analyzes a response message from a second portable terminal and requests data storing, a program which downloads the recorded data from the data management server 50 and a program for executing various functions. Also, if a video telephony call is terminated during a recording mode, the program area may store a program designed to request a termination of data storing. Also, the data area may include data generated according to the application execution and various types of data which is generated using the portable terminal 10, is received from the outside and can be stored. Particularly, in the embodiments of the present invention, the data area may store the recorded data downloaded from the data management server 50 in response to a user's request.

The display unit 130 displays a series of operation states and operation results generated during the execution of functions in a portable terminal 10. Also, the display unit 130 can display the menu of the portable terminal 10 and user data inputted by user or the like. Here, the display unit 130 may be formed as an LCD (Liquid Crystal Display). Particularly, the display unit 130 according to an exemplary embodiment of the present invention can display video data transmitted and received during a video telephony call on real time basis, and can display data such as images stored in the storage unit 120 by user's setting. Also, the display unit 130 can display a recording data list transmitted from the data management server 50 on the screen.

The camera unit 140 converts light inputted through a camera lens into a digital signal through a sensor. The camera unit 140 may include a camera sensor which converts an inputted light signal into an electric signal, and a signal processing unit which converts an analog video signal photographed by the camera sensor into a digital signal. The camera sensor and the signal processing unit can be integrally or separately implemented. Particularly, the camera unit 140 can photograph a user's image during a video telephony call and can transmit video signals for the photographed image to the display unit 130 and the controller 100.

The audio processing unit 150 is connected to a microphone (MIC) and a speaker(SPK), makes an audio signal received from the microphone as data, transmits the data to the controller 100, converts a voice signal inputted from the controller 100 into an audible sounds and outputs the converted signal through the speaker. That is, the audio processing unit 150 can convert an analog voice signal inputted from the microphone into a digital voice signal or can covert a digital voice signal inputted from the controller 100 into an analog voice signal and output the analog voice signal through the speaker.

The first wireless communication unit 160 and the second wireless communication unit 170 form a communication channel with the base station 30 for video telephony call including voice calls between portable terminals, and performs the function of transmitting user data to other external portable terminals. The first wireless communication unit 160 and the second wireless communication unit 170 can form a communication channel set with a supportable mobile communication network, respectively, and can perform one of the communications such as voice calls, video telephony call and data communication. Also, the first wireless communication unit 160 and the second wireless communication unit 170 can include a RF (Radio Frequency) transmission unit which up-converts and amplifies a frequency of transmitted signals and a RF reception unit which low-noise amplifies a received signal and down-converts the frequency. Particularly, one of the first wireless communication unit 160 and the second wireless communication unit 170 forms a communication channel with a third generation (3G) network and processes communication of a portable terminal 10, and the other wireless communication network forms a communication channel with a second generation (2G) network and processes communication of the portable terminal 10.

The controller 100 controls the general operations of each element of the portable terminal 10, and controls a signal flow between blocks in the portable terminal 10. Particularly, in the embodiment of the present invention, if a recording execution request is inputted by a user, the controller 100 can control to transmit a corresponding recording approval request message to another portable terminal.

If an approval or disapproval of recording is received from the other portable terminal, the controller 100 can analyze the response message. If the response message is positive, the controller 100 can transmit a data storing request signal to the base station 30. Thereafter, the controller 100 can receive a data storing start signal transmitted from the base station 30. If a video telephony call terminal signal is received by the user, the controller 100 can request a termination of data storing to the base station 30.

If the data storing operation is terminated, the controller 100 can receive a recording data list transmitted from the base station 30. Here, a plurality of recorded data stored in the data management server 50 can be classified based on storage date in the recording data list and can be sequentially displayed.

The controller 100 can download recorded data or can request transmission of the recorded data to the web server 60 according to a user's request.

In an alternate embodiment, it is possible that one controller that controls the first wireless communication unit 160 for a first communication and another controller that controls the second wireless communication unit 170 for a second communication can be separately configured.

Figure 3:
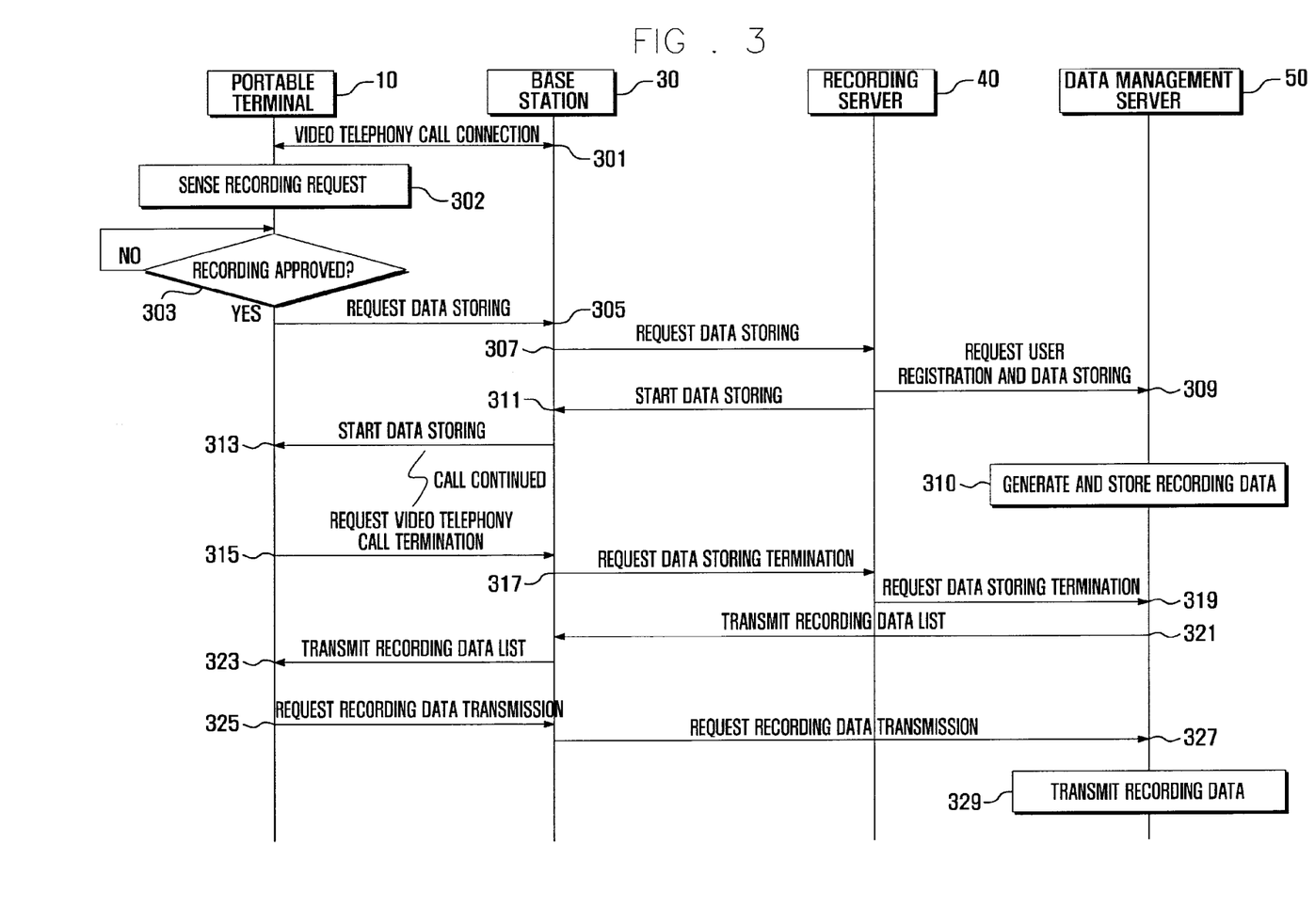
FIG. 3 is a flowchart illustrating the signal relation according to an exemplary embodiment of the present invention.
Figure 4:
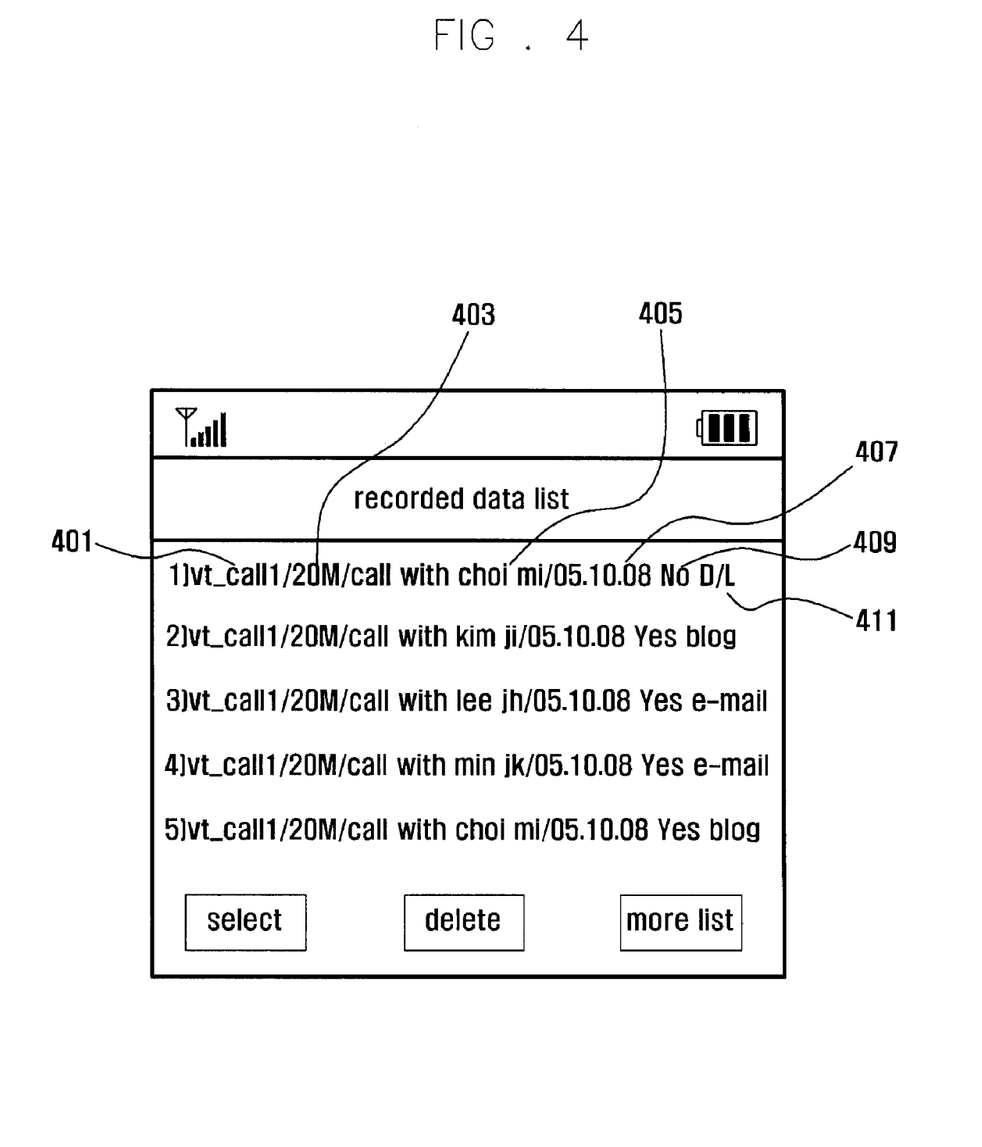
FIG. 4 illustrates a recording data list according to an exemplary embodiment of the present invention.

FIG. 3 is a flowchart illustrating the signal exchanges according to an exemplary embodiment of the present invention, and FIG. 4 illustrates an example of a recording data list according to an exemplary embodiment of the present invention.

Referring to FIGS. 3 and 4, a portable terminal 10 can be connected to a base station 30 and can use various services such as voice calls, video telephony calls and data communication.

The portable terminal 10 performs a video telephony call connection with another portable terminal by connecting to the base station 30 using a wireless communication network (301).

If a user inputs a recording execution request signal, the portable terminal 10 can transmit a corresponding recording approval message to the other portable terminal through the base station 30 (302). The portable terminal 10 can analyze a received response message of the other portable terminal and can determine whether the other party has approved to the execution of recording (303).

If the response message transmitted from the other portable terminal includes approval, the portable terminal 10 requests the recording to the base station 30 (305). If the response message does not indicate an approval, the portable terminal 10 starts a video telephony call without the recording feature. Here, a detailed operation steps of obtain an approval according to an exemplary embodiment of the present invention will be explained later with reference to FIG. 5.

The base station 30 transmits a data storing request signal received from the portable terminal 10 to the recording server 40 (307). The recording server 40 receives a user information of the portable terminal 10 transmitted from the base station 30 in connection with the data storing, and can request a user information registration and data storing to the data management server 50 (309). Here, the user information may include both a portable terminal 10 which requests the recording during a video telephony call and another portable terminal in video communication with the portable terminal 10.

If the user information is registered, the data management server 50 can generate and store the recorded data (310).

If storing of recording data is started, the recording server 40 transmits a message which informs the base station 30 of the start of data storing (311), and the base station 30 transmits a message which informs the portable terminal 10 of the start of data storing (313). Also, the base station 30 can transmits a message which informs another portable terminal of the start of data storing.

The portable terminal 10 can sense a video telephony call termination signal generated according to a user's request. The portable terminal 10 can transmit a data storing termination signal to the base station 30 (315). Also, the base station 30 can request a termination of data storing to the data management server 50 (317). Thereafter, the recording server 40 can request the termination of data storing to the data management server 50.

Further, in the embodiment of the present invention, if a temporary stop signal of data storing is received during a video telephony call from a user, the portable terminal 10 can transmits the corresponding signal to the base station 30. Thereafter, the base station 30 transmits a temporary stop signal of data storing to the recording server 40, and the recording server 40 transmits the temporary stop signal of data storing to the data management server 40. Hence, the data management server 50 can temporarily halt the recording of data.

Also, the base station 30 can transmit a data storing termination request signal to the recording server 40 according to a video telephony call termination request signal received from another portable terminal. The base station 30 can transmit a message about video telephony call termination request of the other portable terminal and a message according to data storing termination to the portable terminal 10.

If storing of recording data is terminated, the data management server 50 can transmit a recording data list to the base station 30 (321). Also, the base station 30 can transmit the recording data list to the portable terminal 10 (323). The portable terminal 10 can receive the transmitted recording data list as a message. For example, as shown in FIG. 4, a portable terminal 10 can receive a recording data list including several recorded data and display the list on the screen. The recorded data may include information corresponding to the call type 401, recording data size 403, information relating to portable terminals 405, date of recording 407, transmission of recording data 409, and a server to which data is transmitted 411. Here, the call type may include video telephony calls and voice calls. Also, a server to which the recorded data is transmitted may include an e-mail server, a blog server and other various application servers. In the recording data list, the recently recorded data can be organized based on a priority according to the recorded date. Further, in case the recorded data is not transmitted to the web server 60, but is downloaded to the portable terminal 10, it may be indicated as "D/L(Download)" on the server to which the recorded data is transmitted.

The portable terminal 10 can transmit a request signal for transmitting at least one of the recorded data selected by a user to the web server 60 to the base station 30 (325). Also, the portable terminal 10 can transmit a signal for downloading one of the recorded data according to a user's request to the base station 30. Thereafter, the base station 30 can transmit a recording data transmission request signal to the data management server 50 (327).

The data management server 50 can transmit the recorded data stored in packet unit to a specific portable terminal designated by user or the web server 60 (329). Also, a specific portable terminal to which recording data is transmitted may be a user's portable terminal or another portable terminal.

Figure 5:
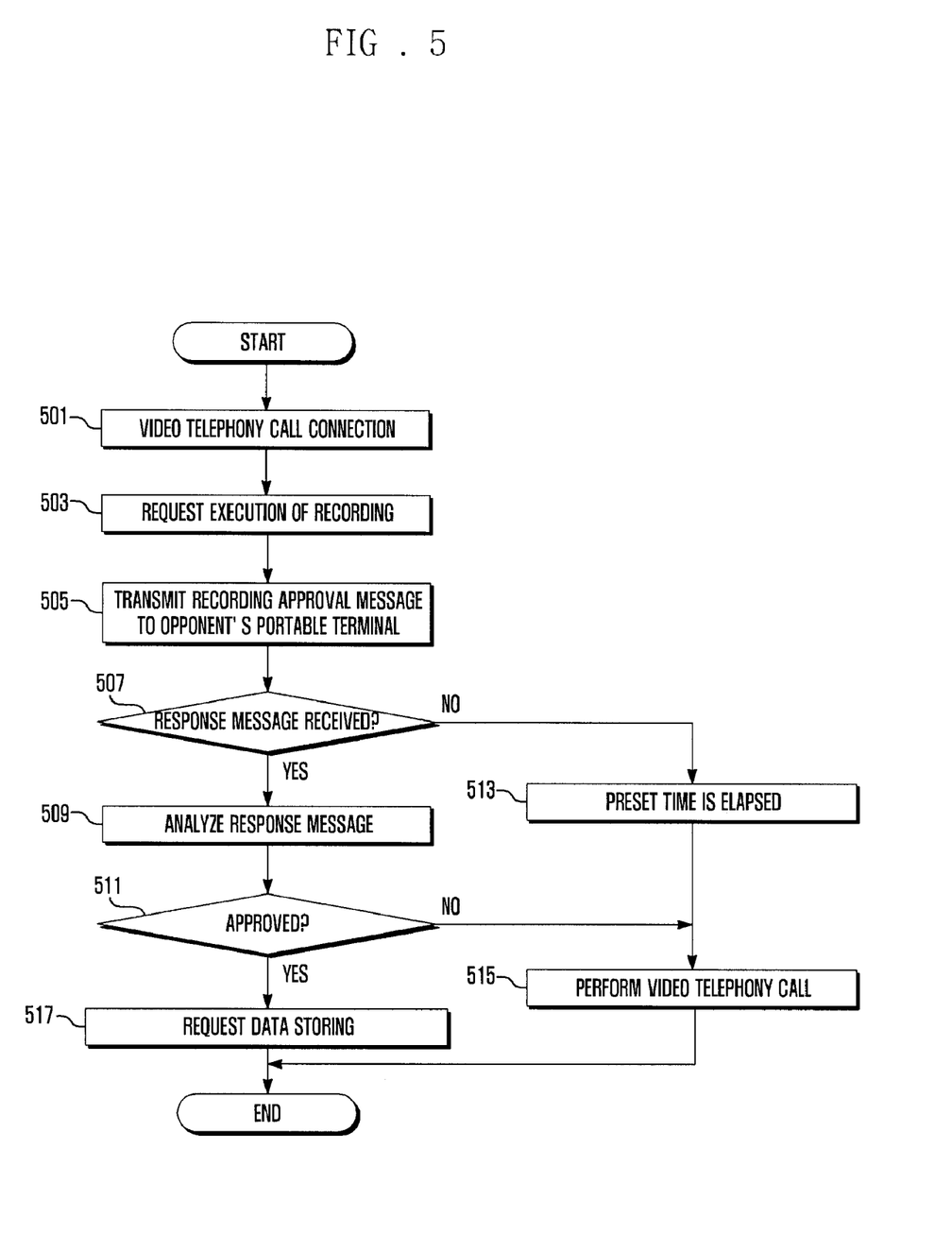
FIG. 5 illustrates a process of approving execution of recording during a video telephony call and process of requesting to store data according to an exemplary embodiment of the present invention.

FIG. 5 illustrates a process of recording data during a video telephony call according to an exemplary embodiment of the present invention.

Referring to FIG. 5, a controller 100 can connect a video telephony call with another portable terminal in response to a user's request (501). Thereafter, the controller 100 can sense a recording signal inputted by the user (503). If the recording signal is received, the controller 100 transmits a recording approval message to another portable terminal (505). Here, the approval message may include user information data, date data and time data of the portable terminal.

The controller 100 determines whether a response message has been received from the other portable terminal (507). At this time, if a response message is received, the controller 100 analyzes the response message (509). Here, the controller 100 can analyze the response message by extracting response information included in the response message. If the response information included in the response message includes an agreement to recording, the controller 100 can consider the recording approved (511). Thereafter, the controller 100 can request data storing to the base station 30 (517). Further, if the response message includes disapproval of the recording the controller 100 performs a video telephony call without recording (515).

Further, if a response message is not received for a predetermined time period, the controller 100 can consider the recording rejected by the other portable terminal user in response to a recording approval message (513). Thereafter, the controller 100 performs a video telephony call without recording.

Figure 6:
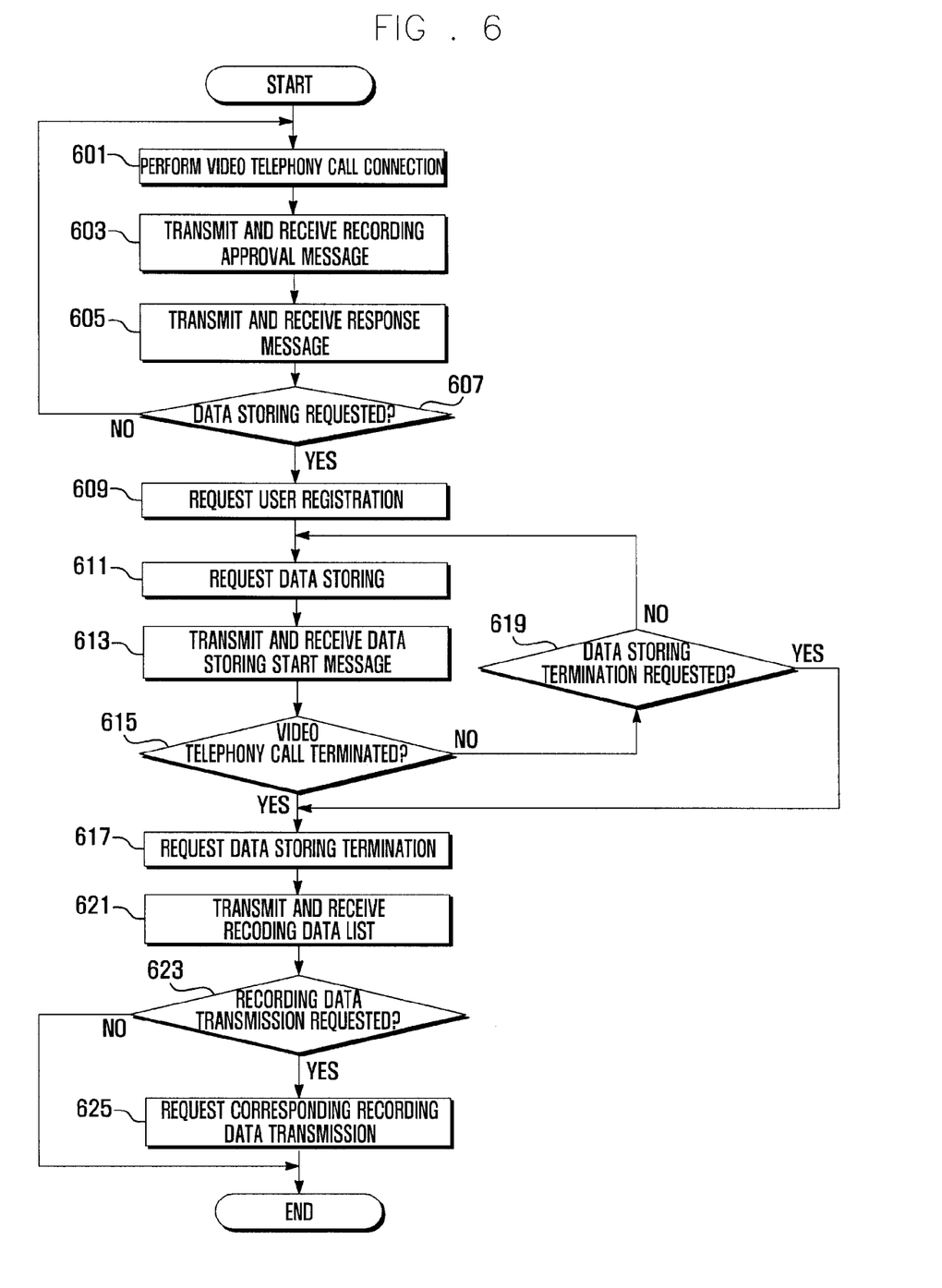
FIG. 6 is a flowchart illustrating the operation of a base station according to an exemplary embodiment of the present invention.

FIG. 6 is a flowchart illustrating operation of a base station according to an exemplary embodiment of the present invention.

Referring to FIG. 6, the base station 30 performs a video telephony call connection between portable terminals (601).

The base station 30 can receive a recording approval message transmitted from the portable terminal 10 according to a recording execution request signal inputted by a user, and can transmit the recording approval message to another portable terminal (603). Thereafter, the base station 30 can transmit a recording response message received from another portable terminal to the portable terminal 10 (605).

The base station 30 can receives a data storing request signal during a video telephony call (607). If a data storing signal is received, the base station 30 can request a user registration to the recording server 40 (609). Also, if a data storing request signal is not received, the base station 30 performs a video telephony call connection between portable terminals.

The base station 30 can transmit the data storing request signal to the data management server 50 through the recording server 40 (611).

If data storing is started, the base station 30 receives a message which informs of the start of data storing transmitted from the recording server 40, and can transmit the received message to the portable terminal 10 (613).

The base station 30 can determine whether a video telephony call termination signal is received (615). If the video telephony call termination signal is received, the base station 30 can transmit a data storing termination request signal to the recording server 40 (617). Hence, the recording server 40 can transmit a data storing termination signal to the data management server 50.

Further, if a video telephony call termination signal is not received, the base station 30 determines whether a data storing termination request signal is received (619). If a data storing termination request signal is received, the base station 30 can consider the signal as a temporary stop signal, and can request a termination of data storing to the recording server 40. Further, if the data storing termination request signal is not received, the base station 30 continually stores the recorded data in the data management server 50.

If data storing is terminated, the base station 30 can receive a recording data list transmitted from the data management server 50 and can transmit the recording data list to the portable terminal 10 (621).

The base station 30 determines whether a recording data transmission request signal is received from the portable terminal 10 (623). If a recording data transmission request signal is received, the base station 30 requests a transmission of corresponding recording data to the data management server 50 (625). The recorded data can be transmitted to the web server 60 or the portable terminal 10. Further, if a recording data transmission request signal is not received, the base station 30 can terminate the execution of function.

According to the present invention, a user of a portable terminal can easily store a large data in a mobile communication server during a video telephony call. Also, the user of a portable terminal can receive a recording data list from a mobile communication server, select a user's desired recording data, and download the selected recording data from the mobile communication server or transmit the selected recording data to a web server. Moreover, in case a plurality of users holds a video conference using a video telephony call, the lengthy meeting can be stored in a mobile communication server, so that the data corresponding to the meeting can be conveniently shared or transmitted subsequently.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for storing data during a video telephony call, comprising:

a first portable terminal requesting a data storing by a data management server in which the data storing includes recording the video telephony call and generating and storing data generated during the video telephony call with a second portable terminal;

a base station in communication with the portable terminals that receives and forwards the request for external recording of the video telephony call;

a recording server in communication with the base station requesting a user registration and transmitting a message indicative of a start of the data storing in response to the store data request from the first portable terminal received via the base station; and wherein the data management server in communication with the recording server records the video telephony call between the first portable terminal and the second portable terminal in response to the store data request of the first portable terminal.

2. The system of claim 1, wherein the second portable terminal transmits to the first portable terminal an approval message for recording of the video telephony call, and wherein at least one of the first portable terminal and the second portable terminal is configured for requesting stopping and/or restarting recording by the data management server while the video telephony call is still in progress.

3. The system of claim 2, wherein the approval message includes user information data, date data, and time data.

4. The system of claim 1, wherein the recorded data includes information corresponding to a call type, recording data size, information relating to the portable terminals, date of recording, transmission of recording data, and a server to which data is transmitted.

5. The system of claim 1, wherein the data management server terminates recording in response to a data storing termination signal, and transmits a recording data list.

6. The system of claim 5, wherein the portable terminals requests a transmission of the recorded data selected by a user among the recording data list.

7. The system of claim 1, wherein the data management server transmits the recorded data to one of a web server and one of the portable terminals selected by a user.

8. The system of claim 1, wherein the base station transmits a message indicative of start of the data storing to one of the portable terminals, and requests a termination of the data storing to the recording server when a termination of the video telephony call is requested from one of the portable terminals.

9. The system of claim 1, wherein the base station receives a recording data list from the data management server, and transmits the recording data list to the portable terminals.

10. The system of claim 9, wherein the base station requests a transmission of at least one recorded data from the recording data list to the data management server.

11. A method of storing data during a video telephony call, the method comprising:

requesting, by a first portable terminal, a data storing that includes recording the video telephony call by generating and storing recording data during the video telephony call by another device communicatively coupled to the first portable terminal that is not a participant in the video telephony call in which said another device comprises a first server;

requesting a termination of recording the video telephone call when the video telephony call is terminated; and transmitting by the first server the recorded data to the first portable terminal or to a second server.

12. The method of claim 11, wherein requesting the storing of data during the video telephony call comprises:

transmitting, by a first portable terminal, an approval message for recording to a second portable terminal; receiving a response message corresponding to the approval message;

requesting the storing of data if the response message is positive.

13. The method of claim 12, wherein the approval message includes user information data, date data, and time data of the portable terminal, and wherein the first portable terminal is configured for requesting stopping and/or restarting recording by the data management server while the video telephony call is still in progress.

14. The method of claim 11, further comprising requesting a user registration information.

15. The method of claim 11, wherein the recorded data includes information corresponding to a call type, recording data size, information relating to the portable terminals, date of recording, transmission of recording data, and the second server to which data is transmitted.

16. The method of claim 11, wherein transmitting the recorded data comprises transmitting a recording data list.

17. The method of claim 16, wherein transmitting the recorded data includes at least one recorded data selected by a user among the recording data list.

18. An apparatus for providing a recording during a video telephony call, comprising:

means for requesting the recording during the video telephony call;

means for requesting an approval of the recording;

means for requesting a storage of the recording in a first server in response to the approval; and means for requesting a transmission of the recording to a second server or a portable terminal.

19. The apparatus of claim 18, further comprising means for terminating the recording of the video telephone call in response to a termination request.

20. The apparatus of claim 18, further comprising means for starting the recording when an approval is received.

* * * * *